Aug. 11, 1964     R. S. SCHULTZ     3,144,167
FOAMED PLASTIC CONTAINER
Filed July 19, 1961
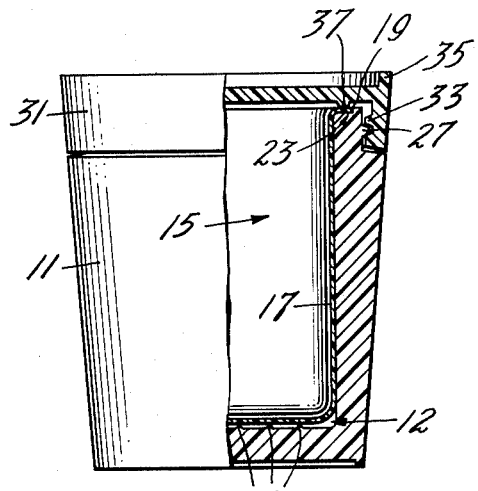
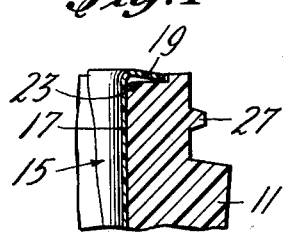
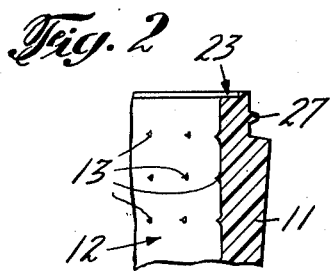
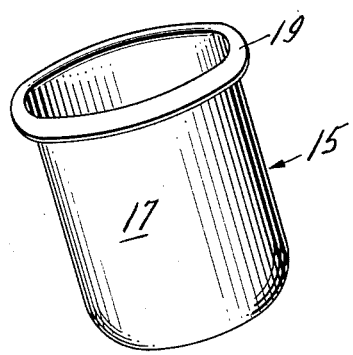
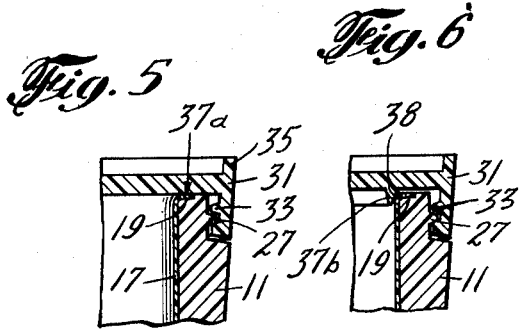
INVENTOR.
ROBERT STEPHEN SCHULTZ
BY Russell L. Root
George W. Reiber
ATTORNEYS

United States Patent Office 3,144,167
Patented Aug. 11, 1964

3,144,167
FOAMED PLASTIC CONTAINER
Robert Stephen Schultz, Somerville, N.J., assignor to American Can Company, New York, N.Y., a corporation of New Jersey
Filed July 19, 1961, Ser. No. 125,187
3 Claims. (Cl. 220—63)

This invention relates to the manufacture of containers, and especially to containers made of foamed or expanded plastic material.

Certain notable advantages in container construction can be obtained by making the container walls of foamed plastic. Of these, reduction in weight is perhaps the most significant, especially when compared with glass containers of similar dimensions.

Many products, however, have been found to store poorly in such containers. If volatile fractions are included in the product, the weight loss may be excessive over a period of time so that the container may prove commercially inacceptable. The passage of volatile material out of the container may be in part due to its natural porosity, and in another part due to the inability of a cap to effectively seal against the surface of the foam plastic material which is slightly spongy and sometimes has slight surface irregularities.

Another feature common to foamed plastic containers is the plurality of tiny projections, hereinafter referred to as "steaming burrs," found on the surface at points where mold openings were placed to admit heated expanding fluid to the unexpanded material. These steaming burrs may be at various places, but it is desirable to forego them on the exterior surfaces of the side walls in order to provide an attractive outer finish. While these steaming burrs may sometimes be confined to the bottom surface of the container, mold openings thus locally arranged do not give the most uniform and even expansion operation throughout the container volume, and a more general distribution is highly preferable for reliable and speedy production whenever it can be tolerated. The most convenient and effective location for steaming openings is throughout the surface of the core member of the mold, which would give rise to steaming burrs throughout the container interior. This would be acceptable in certain situations where the burrs would go unnoticed, for instance in a closed powder shaker. However, for many purposes it has been thought necessary to confine the steaming burrs to the container bottom in spite of the disadvantages entailed because the container must be opened and its interior surface inspected or touched by the user, as would be the case with cosmetic cream jars, for example.

The present invention has for its object the correction of the product weight loss problem in foamed plastic containers by a simple, direct and inexpensive expedient.

Another object of the present invention is the production of economically practical foamed plastic containers which can be made by a process which takes advantage of mold core fluid admission openings regardless of the use to which the containers will be put.

Still another object of the invention is the accomplishment of the two foregoing objects simultaneously by a single, direct expedient.

A feature of the present invention is the inclusion in the container of a thin impervious liner which simultaneously prevents passage of volatile material through the foamed plastic container walls, provides improved surface for making sealing connection with a cap, and provides a shroud which conceals the presence of the steaming burrs on the container interior.

Additional objects, features and advantages will appear hereinafter as the description proceeds.

In the drawing:
FIG. 1 is a side elevation, partially in section, of a completed container according to the present invention.
FIG. 2 is a fragmentary section of the body member shown in FIG. 1 before the liner has been placed.
FIG. 3 is a perspective view of the liner of FIG. 1.
FIG. 4 is a detail section showing the liner in place without the cap and with the parts in relaxed position.
FIG. 5 is a detail section similar to FIG. 4, but showing a cap in place and having an alternate form of liner contacting means.
FIG. 6 is a detail section similar to FIG. 4, but showing a cap in place and having still another alternate form of liner contacting means.

Referring to the drawing, the container of this invention includes a main body member 11 of foamed plastic which has a recess 12 and is preferably so molded that the steaming burrs are on the interior surface of the body. These are indicated at 13 especially in FIG. 2 and are the slight projections formed at the orifices whence the heated expanding fluid (usually steam) is admitted into the mold chamber to activate the expansible beads placed therein in order to cause them to swell and fill the chamber.

Within the body member 11 is a liner 15 consisting of a cup 17 and an integral flange 19 preformed initially with a slightly conical configuration sloping outwardly and downwardly. (See especially FIG. 4.) The liner is of a smooth-surfaced inert plastic material, preferably relatively stiff, but not inflexible or brittle, e.g. linear polyethylene, and is preferably quite thin. For the example shown, consisting of a cosmetic jar between two and three inches in diameter, a liner thickness in the neighborhood of .005 inch over most of its area with a thickness of perhaps .010 inch in the flange area has been found quite satisfactory. The liners 15 can be inexpensively and accurately made by a known vacuum forming and trim punching process, and are dimensioned to have a frictional push fit within the body member 11.

The cup 17 of the liner 15 is preferably very slightly shorter than the recess 12 in the body member 11 so that when the liner is pushed home within the recess 12 the flange 19 will seat firmly against the upper edge of the body 11. In the preferred arrangement shown the body 11 is provided with a slight annular rabbet 23 about its mouth so that the flange 19 will be substantially flush with the upper surface of the body 11. When the liner 15 is pushed home, the flange 19 is flattened but tends to lift slightly again when pressure is released, as seen in FIG. 4.

When the liner 15 is pushed home in the recess 12 two effects are noted. In the first place there is a snug frictional fit tending to retain the liner in place, augmented by the fact that the steaming burrs 13 have to be deformed or flattened to get the liner in place. Secondly if the liner fits snugly as intended, the air between it and the body 11 is expelled by a slight deformation of one or both parts as the liner moves into bottom position. When the liner is home the parts seal against one another and the external air pressure firmly resists removal of the liner. Accordingly no mechanical or adhesive attachment is required. For the purposes of this description and the appended claims, a connection of this character whether primarily by mechanical friction or by close fitting air sealing action can be conveniently referred to as a frictional assembly, and will be thus identified hereinafter.

The body 11 is provided adjacent its mouth with thread 27, and a cap 31 of relatively rigid molded plastic material having internal threads 33, is threaded thereon. The cap 31 is preferably provided with a peripheral rim 35 large enough in diameter to receive the bottom of the body 11, whereby a series of like containers can be firmly and surely stacked one upon the other. On the inner surface of the transverse web of the cap 31 is a liner contacting means for engaging the flange 19 of the liner and producing a reliable seal therewith. In the form shown in FIG. 1 this liner contacting means is in the form of an annular ridge 37, facing downwardly and of a diameter to come into contact with the flange 19 of the liner. The ridge is smooth and regular and, when forced against the smooth regular surface of the flange 19 of the liner by the threading action, flattens the flange against the force of its natural resilience and accordingly forms a sure and reliable seal for the contents of the liner 15. This sealing action is also enhanced by the slightly resilient character of the foam plastic material in the body 11 backing up the flange 19 and urging it uniformly into contact with the ridge 37.

Alternative liner contacting means are illustrated in FIGS. 5 and 6. In FIG. 5 the cap has a smooth flat surface 37a which serves to flatten the flange and provide a seal. In FIG. 6, the cap has a ridge or projection 37b which has a tapered surface 38 which fits just within the mouth of the liner, simultaneously flattening the flange and also exerting a radial component of sealing pressure. The arrangement shown in FIG. 6 is considered the preferred form at present.

From the foregoing it can be seen that the present invention provides a novel container capable of taking full advantage of the beneficial light weight and decorative aspects of foamed plastic material, but which also embodies extremely reliable hermetic sealing properties against the possibilities of both wall permeation and cap joint leakage. Moreover, this result is achieved without increasing the cost of the assembly to such a degree as to render it non-commercial.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A lightweight three-piece nestable container for cosmetics and the like, comprising a generally cup-shaped preformed foamed plastic outer body having an internal recess of predetermined axial extent and an externally threaded neck portion provided along its top surface with a relatively shallow annular recess immediately surrounding the mouth of said body, a substantially cup-shaped thin impervious preformed plastic liner having a radially outwardly directed flange along its open end received in said annular recess and flush with said top surface, said liner having an axial length less than said predetermined axial extent of the internal recess in said outer body whereby said liner may be snapped in place within said body in frictional assembly and close hugging contact therewith, and a molded plastic cap having a central body portion, an internally threaded depending skirt portion and an upstanding collar portion, said cap body portion firmly seating against said liner flange in said recess when the cap internal threads are fully engaged with the external threads on the body neck portion.

2. A container of the character defined in claim 1, in which the radial flange of said liner is significantly thicker than the remainder of said liner, and also in which said flange is slightly conically disposed so as to be resiliently flattened against and received in said annular recess along the top surface of said outer body.

3. A container of the character defined in claim 1, in which the cap body portion has along its lower surface a generally conical flange portion which bears against said liner flange to maintain the same within said annular recess along the top surface of said outer body.

References Cited in the file of this patent

UNITED STATES PATENTS

| | | |
|---|---|---|
| 1,587,167 | Marsden | June 1, 1926 |
| 2,285,614 | Rodgers et al. | June 9, 1942 |
| 2,413,726 | Morrison | Jan. 7, 1947 |
| 2,552,641 | Morrison | May 15, 1951 |
| 2,954,891 | Imber | Oct. 4, 1960 |
| 2,965,256 | Yochem | Dec. 20, 1960 |
| 3,070,253 | Brown | Dec. 25, 1962 |